May 16, 1939.　　　O. RASMUSSEN　　　2,158,337
BRAKE LINING MATERIAL GLASS FABRIC
Filed Sept. 13, 1937
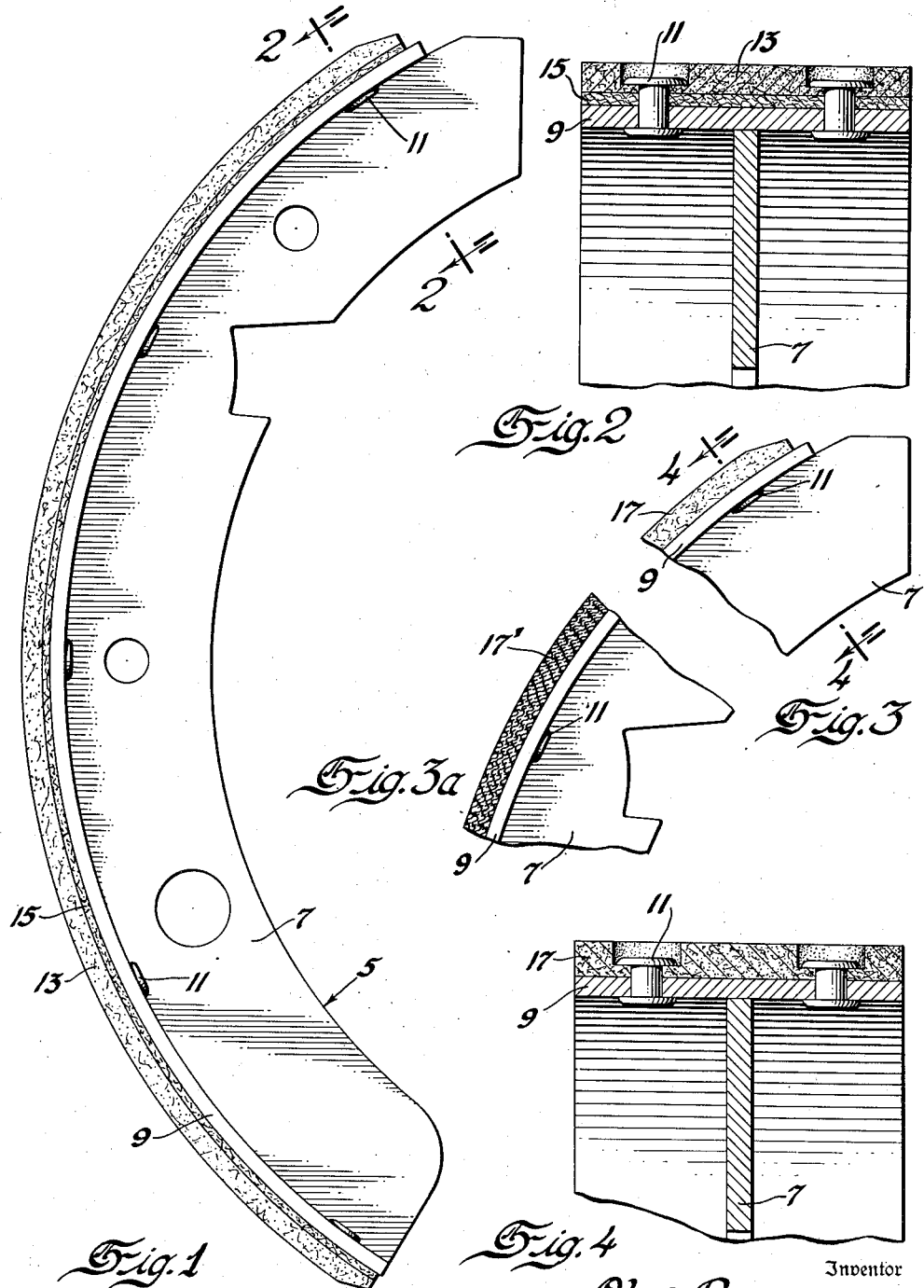
Inventor
Olaf Rasmussen
By
Blackmore, Spencer & Flint
Attorneys Patented May 16, 1939

2,158,337

UNITED STATES PATENT OFFICE 2,158,337

BRAKE LINING MATERIAL GLASS FABRIC

Olaf Rasmussen, Dayton, Ohio, assignor to General Motors Corporation, Detroit, Mich., a corporation of Delaware Application September 13, 1937, Serial No. 163,520

9 Claims. (Cl. 188—250)

This invention relates to brakes and particularly to the frictional surface material which is attached to one of the relatively rotatable elements of a vehicle brake.

In its broader aspect the invention may be regarded as comprehending the use of glass fibers either as such or woven into fabric and used with a brake shoe.

More specifically the fibers or glass fabric may employ therewith a suitable binder. Such a binder may be any suitable metallic substance or, if preferred, the binder may be a plastic substance such as lava or a resinous substance compound or a condensation product like Bakelite.

As a substitute for those mentioned above, there may be used any of the well-known binders used with the conventional asbestos frictional lining. Also with the glass there may be strands of metal in accordance with prior practice with asbestos linings.

In one preferred form there may be employed a layer of woven glass fibers between the metal brake shoe and its drum engaging lining material which latter may be of conventional composition or of the glass fiber variety hereinafter referred to.

The objects of the invention are to secure for a brake certain desirable characteristics such as the avoidance of the bad effects of change in humidity and a lessening of the transfer of heat to the shoes so equipped. In the case of the separate layers, the glass serves to prevent the transmission of heat to the shoe.

The advantage of transferring the heat to the drum will be understood for the reason that the drum is exposed to the atmosphere so that its heat may be more readily radiated away.

Other advantages will be understood from the following description.

In the drawing:

Figure 1 shows in side elevation a brake shoe equipped with a drum engaging friction lining and an underlying layer of glass fabric.

Figure 2 is a section on line 2—2 of Figure 1.

Figure 3 is a view in elevation of a modified form where the fibrous glass material itself constitutes the lining element.

Figure 3A is a view in elevation of another modification.

Figure 4 is a section on line 4—4 of Figure 3.

Referring to the several figures and first to Figure 1, numeral 5 represents a more or less conventional brake shoe having a web 7 and a lining carrying flange 9. Secured by rivets 11 to the flange 9 is a layer of friction lining 13 and an underlying layer of glass fiber.

The layer 13 may be of conventional lining material or it may be like that described in connection with Figure 3 or 3A. The woven glass layer 15 has as an important characteristic the prevention of the transfer of heat. When the friction material 13 engages the drum and becomes heated, the heat is largely transferred to the drum and not to the shoe 5 owing to the interposed layer of glass 15. The drum is exposed to the cooling air and is frequently provided with ribs to add to its surface area. The heat is therefore transmitted away from the drum readily whereas the heat which is transmitted to the shoe is not readily transmitted away for the reason that it is housed within the drum.

In Figures 3 and 3A there are shown forms of the invention in which a liner 17 contains glass in the form of fibers, or, 17', fibers woven into fabric. In these cases the glass liner 17 or 17' itself constitutes the friction material in place of or, if preferred, associated with asbestos or other material. For binding the fibers there may be used any known or preferred type of binder, no invention per se being claimed for any specific binder. There may be used any known metallic binder or if desired any of the binders heretofore used for the more conventional frictional material may be adopted such as a plastic substance like lava, a resinous compound, or a condensation product such as Bakelite. With these forms of the invention the resistance to the damaging effects of moisture improves the action of the brake when subjected to conditions of humidity, and the presence of the fibrous glass as before avoids the trapping of the heat developed by friction in the shoe enclosed within the drum.

I claim:

1. In a friction brake, a braking member, a second member, a quantity of fibrous glass carried by the braking member and adapted to frictionally engage said second member to avoid the effects of humidity and to prevent transmission of heat.

2. In a friction brake, a shoe, a layer of friction material containing fibrous glass, a layer of fibrous glass between said shoe and said friction material and means to secure said parts together.

3. In a friction brake, a shoe, a layer of friction material containing fibrous glass, a layer of woven fibrous glass between the shoe and the friction layer and means to secure said parts together.

4. In a brake, a shoe, a friction layer secured thereto, said layer including fibers of spun glass and a suitable binder.

5. In a brake, a shoe, a friction layer secured thereto, said layer including fibers of spun glass woven into a fabric, and means securing said friction layer to said shoe.

6. The invention defined by claim 4, said binder being of plastic material.

7. In a friction brake, a drum, a shoe, a layer of glass fabric secured to the shoe and adapted to frictionally engage the drum.

8. In a friction device, frictionally engaging members, one of said members having a facing comprising as a part thereof a quantity of fibrous glass.

9. The invention defined by claim 8, said fibrous glass being woven.

OLAF RASMUSSEN.